(12) United States Patent
Raab (10) Patent No.: US 7,804,602 B2
(45) Date of Patent: Sep. 28, 2010

(54) APPARATUS AND METHOD FOR RELOCATING AN ARTICULATING-ARM COORDINATE MEASURING MACHINE

(75) Inventor: Simon Raab, Santa Barbara, CA (US)

(73) Assignee: Faro Technologies, Inc., Lake Mary, FL (US)

( * ) Notice: Subject to any disclaimer, the term of this patent is extended or adjusted under 35 U.S.C. 154(b) by 1000 days.

(21) Appl. No.: 11/473,710

(22) Filed: Jun. 23, 2006

(65) Prior Publication Data
US 2009/0177438 A1 Jul. 9, 2009

Related U.S. Application Data

(60) Provisional application No. 60/693,295, filed on Jun. 23, 2005.

(51) Int. Cl.
*G01B 11/14* (2006.01)
(52) U.S. Cl. .................................. 356/614; 356/623
(58) Field of Classification Search ......... 356/614–622, 356/2, 601–613
See application file for complete search history.

(56) References Cited

U.S. PATENT DOCUMENTS

| | | | |
|---|---|---|---|
| 4,691,446 A | 9/1987 | Pitches et al. .................. 33/516 |
| 4,714,339 A | 12/1987 | Lau et al. ..................... 356/4.5 |
| 4,790,651 A | 12/1988 | Brown et al. .................. 356/4.5 |
| 5,402,582 A | 4/1995 | Raab .......................... 33/503 |
| 5,903,459 A * | 5/1999 | Greenwood et al. .......... 700/110 |
| 6,069,700 A | 5/2000 | Rudnick et al. ............. 356/359 |
| 6,420,694 B1 * | 7/2002 | Greenwood .................. 250/221 |
| 6,847,436 B2 * | 1/2005 | Bridges ..................... 356/4.02 |
| 6,901,673 B1 * | 6/2005 | Cobb et al. ................... 33/502 |
| 7,079,234 B2 * | 7/2006 | Vogel ....................... 356/141.1 |
| 2003/0048459 A1 | 3/2003 | Gooch ........................ 356/620 |
| 2003/0206285 A1 | 11/2003 | Lau ........................... 356/4.09 |

OTHER PUBLICATIONS

The State Intellectual Property of the People's Republic of China; Chinese Office Action mailed Jul. 10, 2009.
The State Intellectual Property Office of the People's Republic of China; English translation of Chinese Office Action; Mailed Jul. 10, 2009.
Wang, Jia et al., "Experimental research on laser tracking virtual coordinate measurement system and self-calibration method"; Optical Technique, vol. 27, No. 5; Sep. 2001; pp. 447-450; Chinese language with English abstract.
PCT Search Report—PCT/US2006/024353.
EP Search Report for European Patent Application 10159062.8; Mailing date May 27, 2010.
International Preliminary Report on Patentability for International Patent Application PCT/US2006/024353; Mailing date Jan. 10, 2008.

* cited by examiner

*Primary Examiner*—Michael P Stafira
(74) *Attorney, Agent, or Firm*—Cantor Colburn LLP (57) ABSTRACT

A measurement apparatus, system and method for measuring objects which is easily relocatable about the object is described. The system uses an articulated-arm coordinate measuring machine (CMM) and a laser tracker. A retroreflector for use with the laser tracker is located on the arm of the articulated-arm (CMM). A common coordinate frame of reference can be determined for the CMM and the laser tracker so that the CMM can be moved. Also, points hidden from the laser tracker can be measured for example with the CMM.

5 Claims, 6 Drawing Sheets

APPARATUS AND METHOD FOR RELOCATING AN ARTICULATING-ARM COORDINATE MEASURING MACHINE

CROSS-REFERENCE

This application claims priority to U.S. provisional application 60/693,295 filed Jun. 23, 2005, which is incorporated herein by reference.

BACKGROUND

The present disclosure relates to two coordinate measuring devices. One of these devices belongs to a class of instruments that measure the coordinates of a point by probing the point with an articulated mechanical structure. The probing may be performed with a mechanical probe tip or with a non-contact scanning device. The position of the probe tip is determined by the readings of angular encoders located at the mechanical joints that interconnect the articulating segments. This type of device, whether it uses a mechanical probe tip or a scanner, is referred to as an articulated-arm coordinate measuring machine (CMM). An exemplary system belonging to this class of devices is described by U.S. Pat. No. 5,402,582 to Raab.

The other of these devices is an instrument, referred to as a laser tracker, which measures the coordinates of a point by sending a laser beam to a retroreflector target that is in contact with the point. The laser tracker determines the coordinates of the point by measuring the distance and the two angles to the retroreflector. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest. Exemplary systems belonging to this class of instruments are described by U.S. Pat. No. 4,790,651 to Brown et al. and U.S. Pat. No. 4,714,339 to Lau et al.

The articulated-arm CMM is capable of being bent into a variety of orientations. Because of this, it is able to measure "hidden" points; that is, points that are hidden from the line-of-sight view of a measuring device such as a laser tracker. On the other hand, the laser tracker can measure over a much larger volume than the articulated-arm CMM. What is needed is a way to obtain the convenience of measuring hidden points with the articulated-arm CMM over the larger measurement volume of the laser tracker.

SUMMARY

An embodiment may comprise a system for coordinate measurement comprising: a laser tracker; a retroreflector; a moveable articulated-arm coordinate measuring machine (CMM) that may be relocated to different positions; an assembly for attaching the retroreflector to the articulated-arm coordinate measuring machine (CMM); wherein the system is structured so that a laser beam may be sent from the laser tracker in order to measure a position of the retroreflector relative to the laser tracker in a first coordinate system while the articulated-arm coordinate measuring machine (CMM) also measures the position of retroreflector relative to the articulated-arm coordinate measuring machine (CMM) in a second coordinate system and wherein the moveable articulated-arm coordinate measuring machine (CMM) may be relocated to different positions and the measurements may be performed again; and means for transforming the first coordinate system and/or the second coordinate system to a common coordinate frame of reference.

An embodiment may comprise a method for coordinate measurement comprising: placing a laser tracker at a fixed location; placing at another location a moveable articulated-arm coordinate measuring machine (CMM) to which a retroreflector has been attached thereto so that the retroreflector may be moved to different locations while the laser tracker remains in the fixed location; sending and reflecting a laser beam from the laser tracker to the retroreflector in order to measure a position of the retroreflector in a first coordinate system and also measuring the position of the retroreflector with the articulated-arm coordinate measuring machine (CMM) while the retroreflector is located in the same position in order to also measure the position of the retroreflector relative to the articulated-arm coordinate measuring machine (CMM) in a second coordinate system; and transforming the measurements of the position of the retroreflector taken in first coordinate system and/or the second coordinate system to a common coordinate frame of reference.

An embodiment may also comprise a retroreflector assembly for use with an articulated-arm coordinate measuring machine (CMM) comprising: a retroreflector; and a mount to attach the retroreflector on the articulated-arm coordinate measuring machine (CMM).

An embodiment may also comprise a method of relocating an articulated-arm coordinate measuring machine (CMM) for measuring an object at different positions about the object comprising: measuring a first set of coordinates in a first coordinate system of a first position of a retroreflector located on an arm of an articulated-arm coordinate measuring machine (CMM) by using angular sensors located in the articulated-arm coordinate measuring machine (CMM); measuring also a first set of second coordinates in a second coordinate system of the retroreflector located on the arm by using a laser tracker and a laser beam sent from the laser tracker to reflect back from the retroreflector to the laser tracker; moving links of the articulated-arm coordinate measuring machine (CMM) to reposition the retroreflector to a second position and measuring a second set of coordinates in a first coordinate system of the second position of the retroreflector located on an arm of an articulated-arm coordinate measuring machine (CMM) by using angular sensors located in the articulated-arm coordinate measuring machine (CMM); measuring also a second set of second coordinates in the second coordinate system of the retroreflector located on the arm by using a laser tracker and a laser beam sent from the laser tracker to reflect back from the retroreflector to the laser tracker; moving the links of the articulated-arm coordinate measuring machine (CMM) to reposition the retroreflector to a third position and measuring a third set of coordinates in a first coordinate system of the third position of the retroreflector located on an arm of an articulated-arm coordinate measuring machine (CMM) by using angular sensors located in the articulated-arm coordinate measuring machine (CMM); measuring also a third set of second coordinates in a second coordinate system of the retroreflector located on the arm by using a laser tracker and a laser beam sent from the laser tracker to reflect back from the retroreflector to the laser tracker; and forming a transformation matrix with the three sets of first and second coordinates that relates all of the sets of coordinates to a common frame of reference.

An embodiment may also comprise a laser measurement apparatus for measuring objects comprising: an articulated-arm coordinate measuring machine (CMM) having angular encoders; a laser tracker having a distance meter and angular encoders; and a retroreflector for use with the laser tracker located on the arm of the articulated-arm (CMM).

BRIEF DESCRIPTION OF THE DRAWINGS

Referring now to the drawings, examples of embodiments are shown which should not be construed to be limiting regarding the entire scope of the disclosure, and wherein the elements are numbered alike in several FIGURES.

DETAILED DESCRIPTION OF EXEMPLARY EMBODIMENT

Reference will now be made in detail to an exemplary embodiment, an example of which is illustrated in the accompanying drawing.

Figure 1:
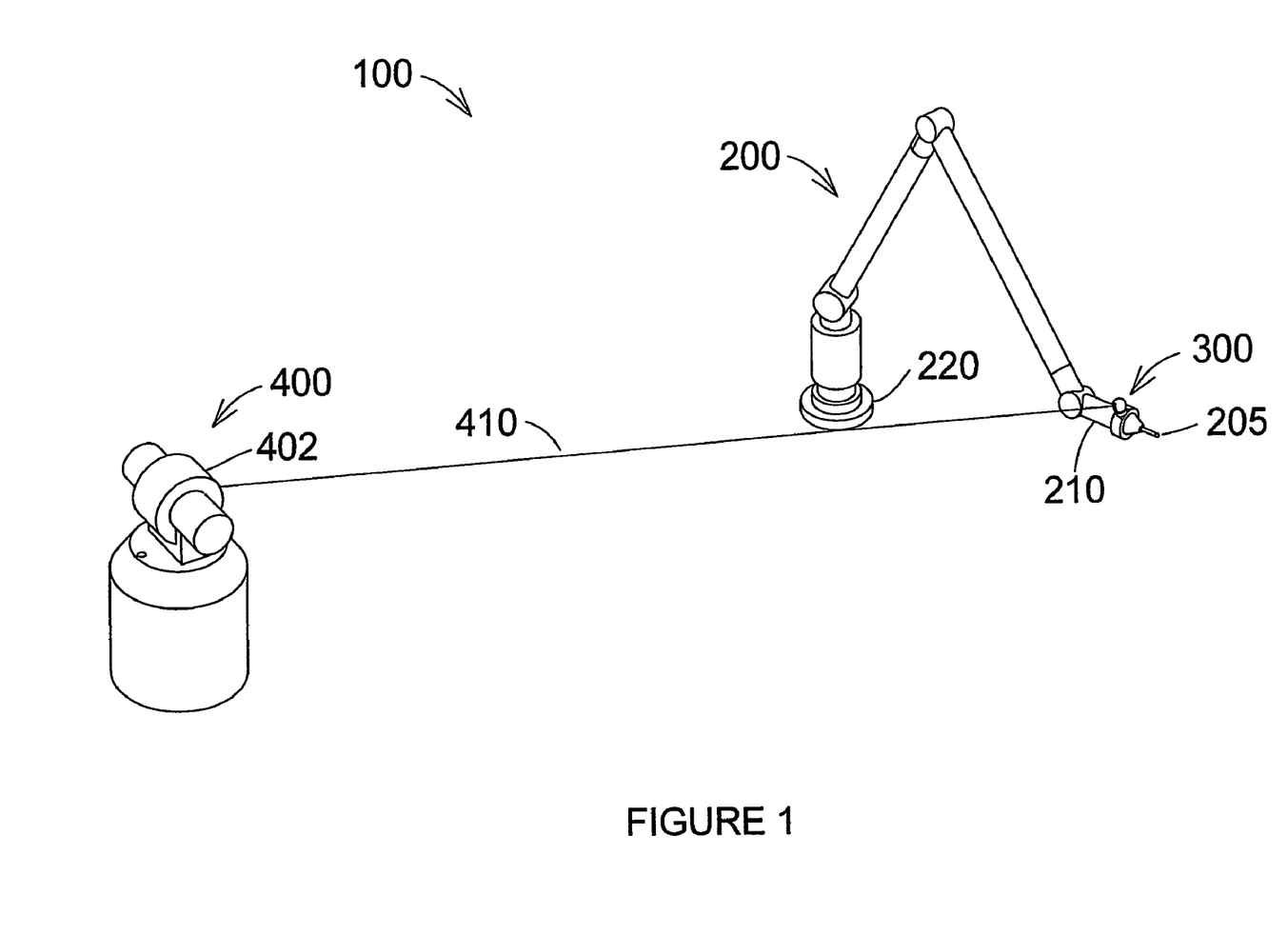
FIG. 1 is a perspective view of an articulated-arm CMM used in conjunction with a laser tracker.

An example of a large-scale coordinate probing system 100 is shown in FIG. 1. Probing system 100 comprises articulated-arm CMM 200, retroreflector clamp assembly 300, and laser tracker 400. Other orientations, arrangements, set-ups, and variations are possible and contemplated depending upon the specific application in the field for example. Thus, this example should not be considered to be limiting.

Figure 2:
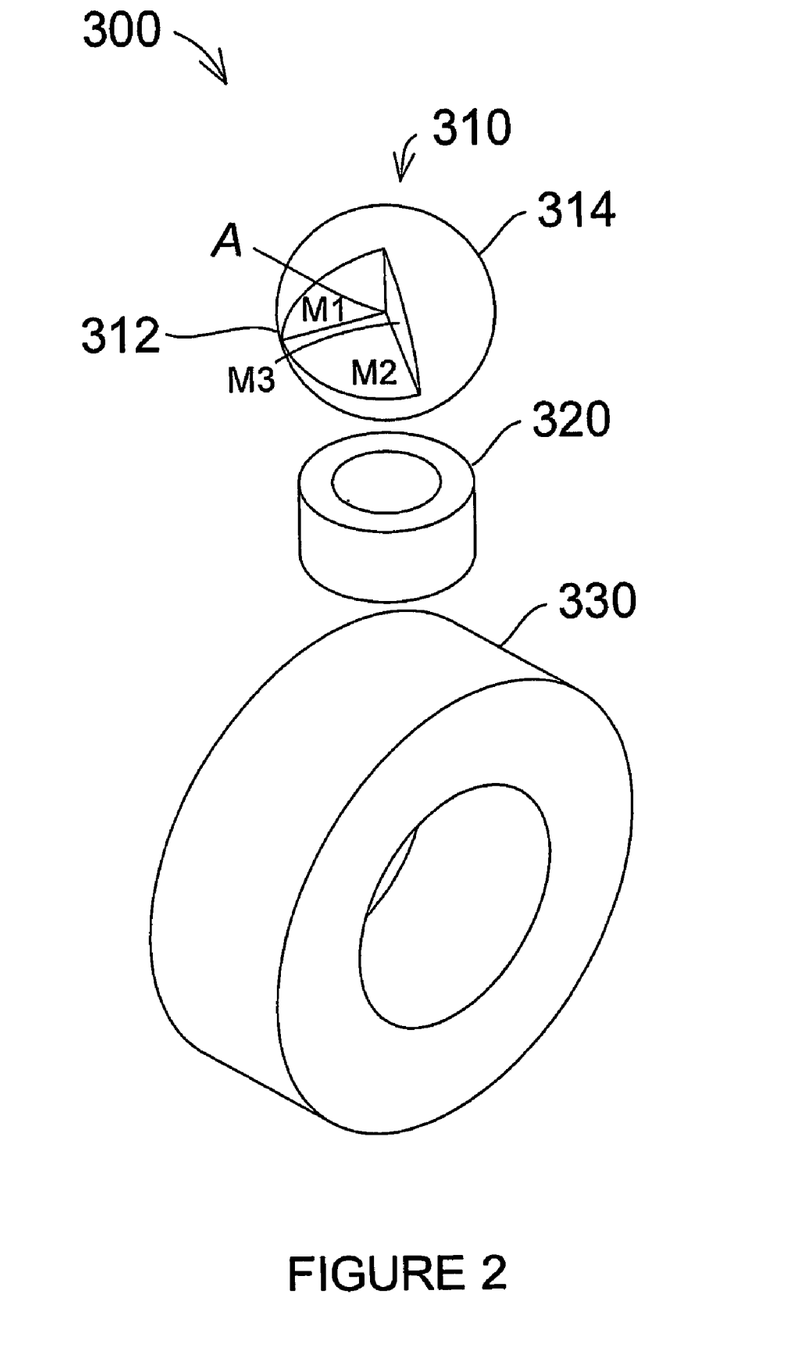
FIG. 2 is an exploded, perspective view of a retroreflector clamp assembly.

FIG. 2 shows an exploded view of retroreflector clamp assembly 300, which comprises spherically mounted retroreflector (SMR) 310, kinematic nest 320, and clamp 330. SMR 310 comprises cube-corner retroreflector 312 embedded within partial sphere 314. Cube-corner retroreflector 312 comprises three flat mirror segments (M1, M2, M3) which are joined together in such a way that each glass segment makes a ninety degree angle with respect to the other two glass segments. The point of common intersection of the three glass segments is called the apex "A" of SMR 310. The apex "A" is located at the spherical center of partial sphere 314.

Kinematic nest 320 attaches to the top of clamp 330, which in turn locks onto the final link 210 of articulated-arm CMM 200. Thus, the clamp 330 allows the retroreflector clamp assembly 300 to be placed onto articulated-arm CMM 200.

Kinematic nest 320 has three point-like contacts (not shown) onto which the spherical surface of SMR 310 rests. These point-like contacts ensure that the center of SMR 310 remains at the same point in space as SMR 310 is rotated. Kinematic nest 320 preferably contains a magnet in its base to ensure that SMR 310 is kept in constant contact with the three point-like contacts.

As shown in FIG. 1, Laser tracker 400 sends laser beam 410 to SMR 310. Cube-corner retroreflector 312 reflects the light from the laser tracker back to the laser tracker 400 along the same line 410 as the outgoing laser beam. The laser tracker 400 monitors the position of the returning laser beam and adjusts the position of the tracker head 402 to keep the laser beam centered on SMR 310, even as the SMR 310 is moved from point to point. In this example, the operator moves the end of articulated-arm CMM 200 to three distinct positions, but may also move the articulated-arm CMM 200 to twelve or more positions or possibly one position only. At each position, measurements of the SMR 310 retroreflector coordinates are made by both articulated-arm CMM 200 and laser tracker 400. Articulated-arm CMM 200 does this by using its built-in angular encoders (not shown) which typically are located in the joints of the articulated-arm CMM 200. Laser tracker 400 does this by using its distance meter and angular encoders (not shown). Other types of encoders and distance meters may also be used.

By comparing this data collected by articulated-arm CMM 200 and laser tracker 400, a transformation matrix is determined for converting from the coordinate system of articulated-arm CMM 200 to the coordinate system of laser tracker 400 or vice versa. Alternatively, both sets of data can be converted into some other preferred coordinate system xyz.

When measuring a large object with articulated-arm CMM 200, it is often necessary to move articulated-arm CMM 200 to a different position in order to measure other portions of the large object that are not accessible to measurement from the first position. This action of moving articulated-arm CMM 200 to a different position is referred to as "relocation." The above procedure of simultaneously measuring the position of SMR 310 with articulated-arm CMM 200 and laser tracker 400 is performed whenever articulated-arm CMM 200 is relocated (see FIG. 3 where articulated-arm CMM 200 is moved from position A to position B for example). This permits the data collected from the several locations of articulated-arm CMM 200 to be seamlessly stitched together in the same common coordinate system in the same frame of reference. With the method described above, articulated-arm CMM 200 can be quickly and accurately relocated to any position within the measurement volume of laser tracker 400.

This is a great improvement over prior art solutions where such an relatively easy relocation process is not possible because several nests (for example four nests) were usually placed on a floor as a frame of reference for an articulated-arm CMM. Thus, the nests had to also be relocated when an articulated-arm CMM was relocated and all points of reference had to be relatively recalibrated for example.

Figure 3:
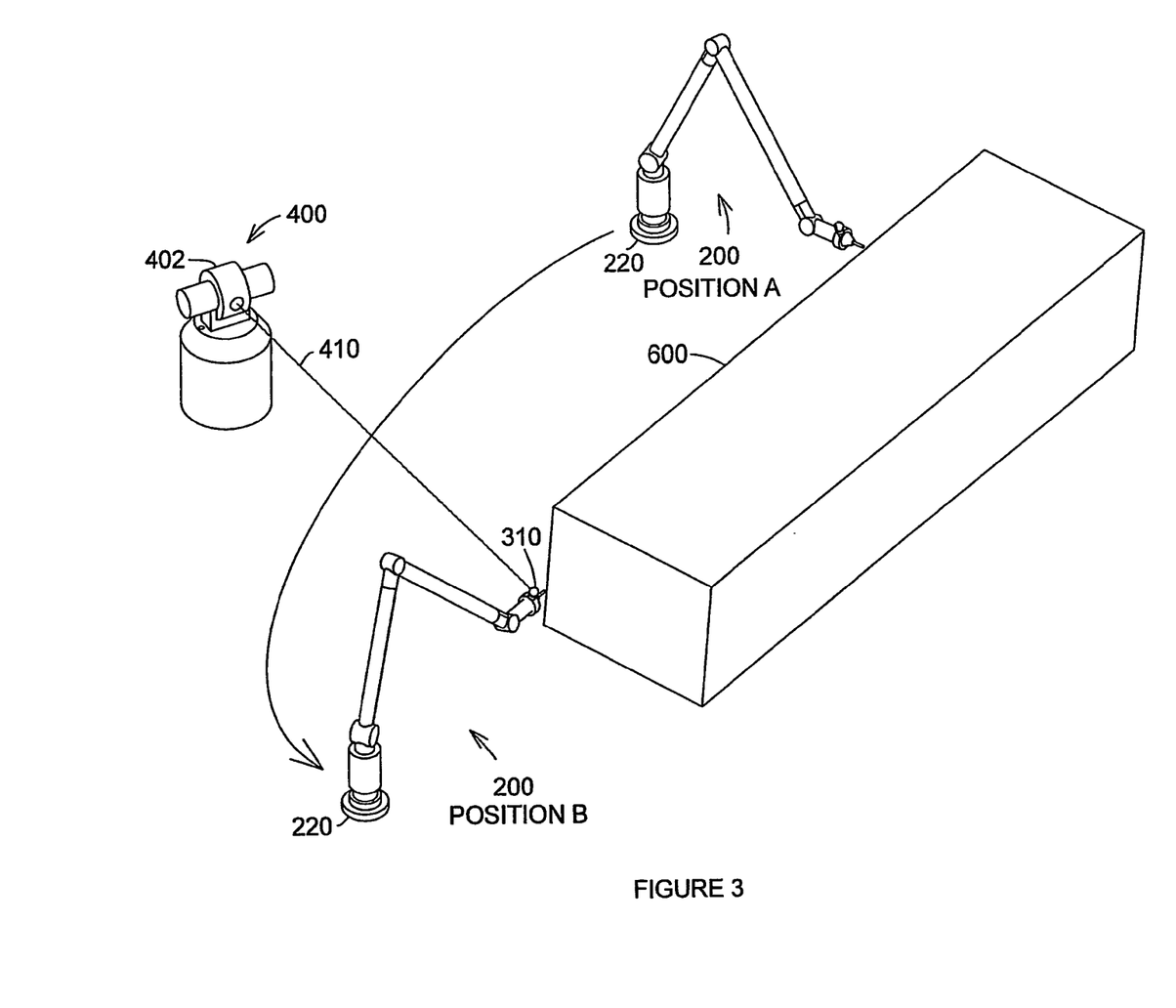
FIG. 3 is a perspective view of the articulated-arm CMM relocated to a second position through the use of the laser tracker.

An example of articulated-arm CMM 200 moved from a first position (POSITION A) to a second position (POSITION B) to measure a large object 600 is shown in FIG. 3. In this figure, the laser tracker 400 provides fast and accurate relocation of the articulated-arm CMM 200.

The following techniques may also be implemented to improve the accuracy of relocating an articulated-arm CMM: (1) measure many points (for example, more than three) with the articulated-arm CMM and laser tracker; (2) measure points separated as much as possible in three-dimensional space (that is, near the outer edges of the articulated-arm measurement envelope); and (3) measure points covering all three dimensions (that is, avoid collecting points that lie entirely on or near a plane).

Compensation to Find SMR Position

Figure 6A:
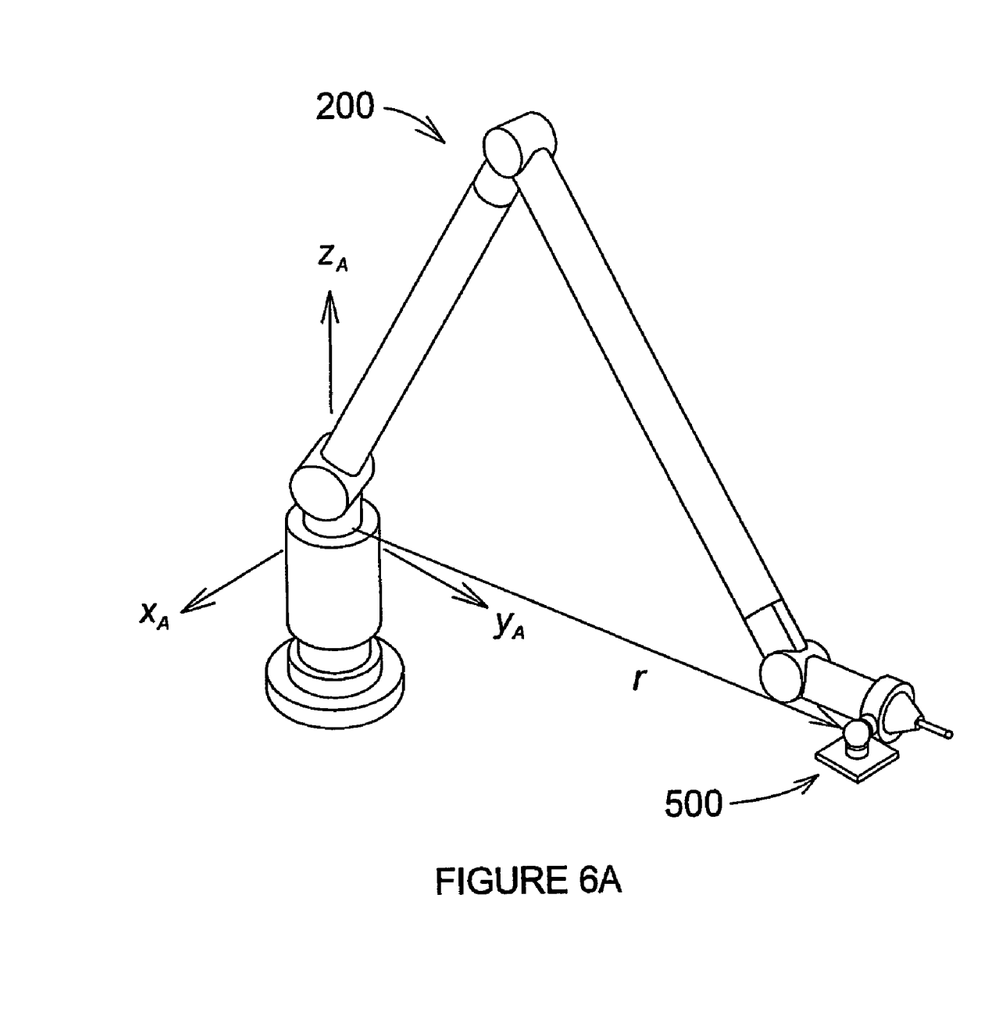
FIGS. 6A and 6B are perspective view of an articulated-arm CMM with reference made to the mathematical nomenclature.
Figure 6B:
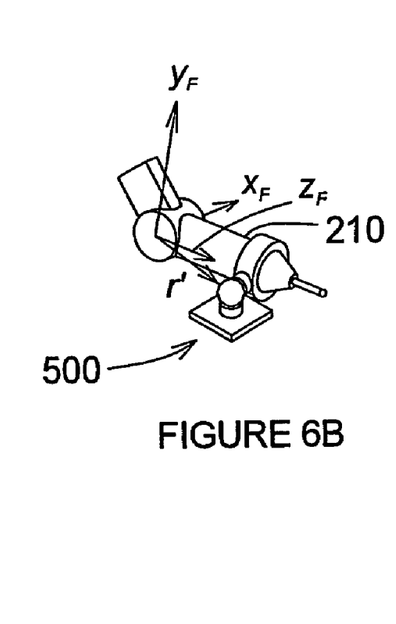

When retroreflector clamp assembly 300 is first attached to articulated-arm CMM 200, the coordinates of SMR 310 must be found in relation to the frame of reference of final link 210 (see FIG. 6B). To do this, a compensation procedure is performed using mounted sphere 500 shown in FIG. 4. This may also be termed an "initial compensation" procedure, because is it only necessary to be performed when the retroreflector clamp assembly 300 is first attached to articulated-arm CMM 200.

Figure 4:
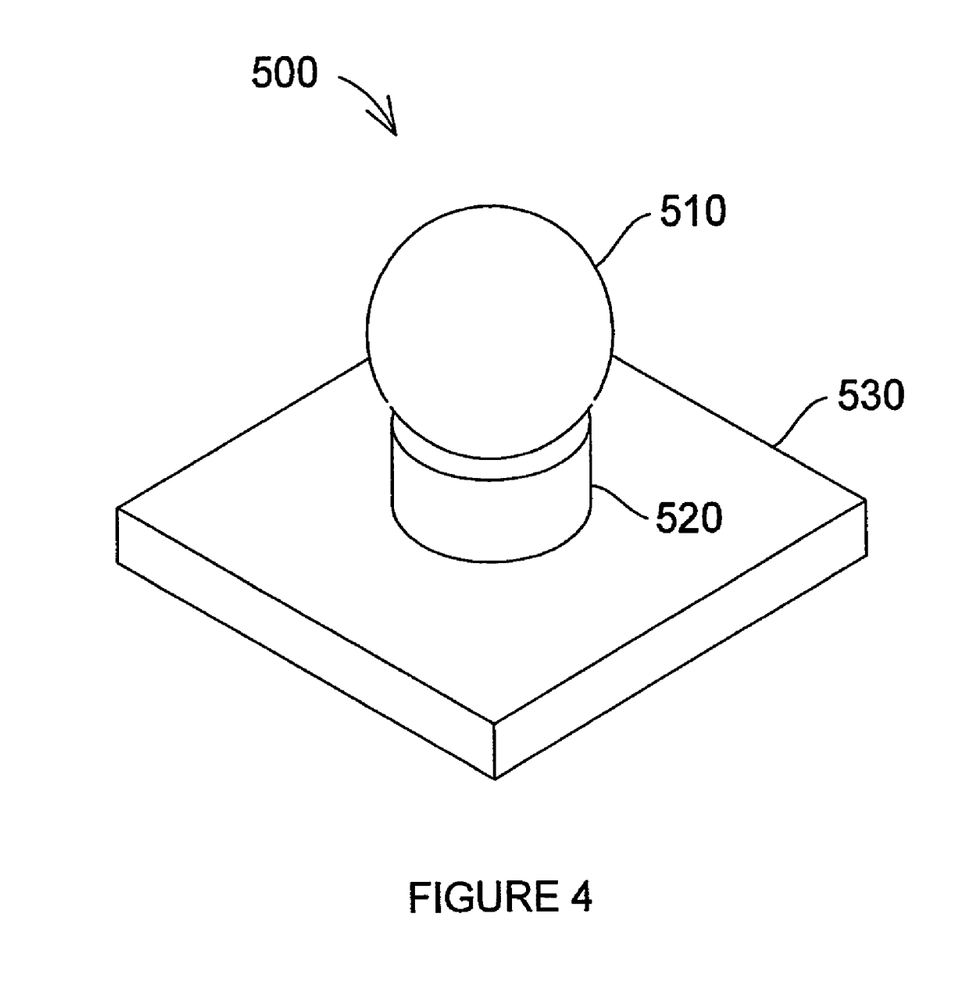
FIG. 4 is a perspective view of a mounted sphere assembly.

Mounted sphere 500 comprises metal sphere 510, magnetic nest 520, and base 530. Metal sphere 510 may have the same diameter as SMR 310, for example. Magnetic nest 520 has three point-like contacts (not shown) onto which the metal sphere 510 rests. A magnet (not shown) holds metal sphere 510 securely against the three point-like contacts. Magnetic nest 520 is attached to base 530, which in turn is attached to the floor on another stable surface.

Figure 5A:
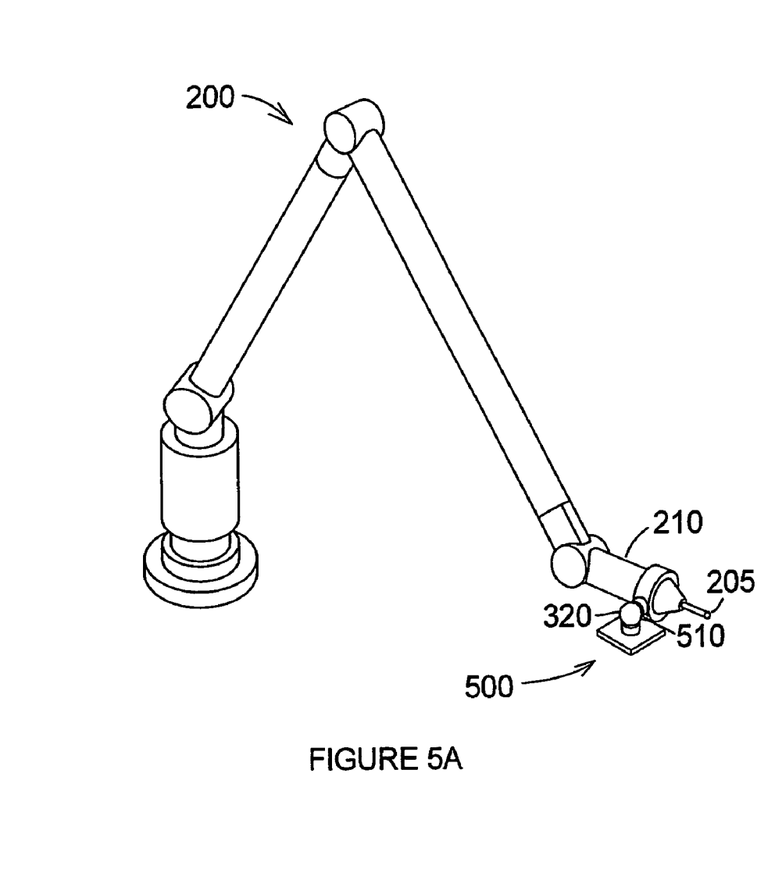
FIGS. 5A and 5B are perspective views of the retroreflector nest in contact with the mounted sphere.
Figure 5B:
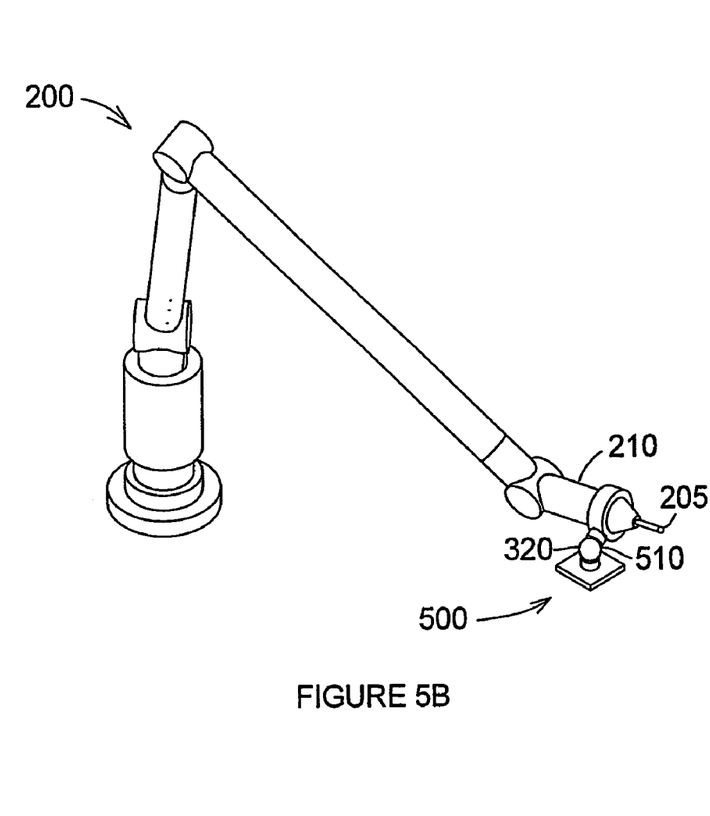

At the start of the compensation procedure to find the SMR position, SMR 310 is removed from kinematic nest 320. Kinematic nest 320 is brought in contact with metal sphere 510, which is sitting on magnetic nest 520. This is shown in FIG. 5A. Subsequently, the links or sections of articulated-arm CMM 200 are moved into a different position, as shown in FIG. 5B. The exact position of kinematic nest 320 is not important. By repositioning the links at least one more time, but preferably many more times, the angles on the angular encoders of articulated-arm CMM can be used to determine the position of the center of SMR 310.

The mathematics for determining coordinates using articulated links such as are found on robots or articulated-arm CMMs are well known. For example, the relevant equations are described in chapters 3 and 4 of *Robot Modeling and Kinematics* by Rachid Manseur. With these equations, one can relate the position $\vec{r}'$ of the center of metal sphere 510 within the frame of reference of final link 210 to the position $\vec{r}$ of the center of metal sphere 510 within the fixed frame of reference of base 220 of articulated-arm CMM 200. Possible vectors $\vec{r}'$ and $\vec{r}$ for a particular articulated arm CMM are shown in FIGS. 6A, 6B. To clarify the meaning of these vectors, local coordinate systems $(x_A, y_A, z_A)$ and $(x_F, y_F, z_F)$ for articulated-arm CMM 200 and final link 210, respectively, are shown in FIGS. 6A, 6B. In the case of the compensation procedure to find the coordinates of the SMR as described above, the constraint of metal sphere 510 causes vectors $\vec{r}'$ and $\vec{r}$ to remain constant even as the links of articulated-arm CMM 200 are moved about. The equation that relates the two vectors is:

$$\vec{r} = T(\vec{\theta}_i) \cdot \vec{r}'. \quad (1)$$

In this equation, $T(\vec{\theta}_i)$ is a 4×4 transformation matrix that depends on the so-called Denavit-Hartenberg (DH) parameters for each link, as explained in the book by Manseur cited above. For each link, only one of DH parameters, the link angle θ, varies during the compensation procedure. The other DH parameters are characteristic of a particular articulated-arm CMM and will already have been determined by a factory compensation procedure carried out at the time the articulated-arm CMM is manufactured. The fixed parameters are determined by a separate factory compensation procedure. The vector notation $\vec{\theta}_i$ indicates that T is a function of the angular encoder readings for all of the joints in the Arm, and i indicates the $i^{th}$ measurement, where each measurement corresponds to a different position of articulated-arm CMM 200, two example positions of which are shown in FIGS. 5A, 5B. If articulated-arm CMM 200 is moved to a large number of different positions, there will not be a unique solution to Equation (1). Instead, the best estimate of the vectors $\vec{r}'$ and $\vec{r}$ is made by minimizing the total residual error. For the $i^{th}$ measurement, the residual error is defined as:

$$res_i = |T(\vec{\theta}_i) \cdot \vec{r}' - \vec{r}|. \quad (2)$$

To minimize the total residual error, $\vec{r}'$ and $\vec{r}$ are selected to minimize the sum of the square of the $res_i$ values. In this case, $\vec{r}'$ and $\vec{r}$ are each represented by three coordinate values (for example, x, y, and z), so that there are six parameter values that need to be found. The procedure for selecting parameters to minimize a sum of squared values is well known in the art and is readily carried out using widely available software. This procedure will therefore not be discussed further.

Relocation Calculation

As mentioned previously, articulated-arm CMM 200 is conveniently relocated by simultaneously measuring by position of SMR 310 with articulated-arm CMM 200 and laser tracker 400 with SMR 310 moved to several different positions. The measurements collected by articulated-arm CMM 200 are related to the measurements of laser tracker 400 through the equation:

$$\vec{s} = M(rx, ry, rz, tx, ty, tz) \cdot \vec{s}'. \quad (3)$$

In this equation, $\vec{s}$ and $\vec{s}'$ are the coordinates of the SMR 310 in the frame of reference of laser tracker 400 and the frame of reference of articulated-arm CMM 200, respectively. The quantities rx, ry, rz are the Euler angles representing rotations about the X, Y and Z axes respectively, and tx, ty, tz are the displacements in X, Y and Z respectively. The matrix M(rx, ry, rz, tx, ty, tz) transforms the coordinates of SMR 310, as measured by the relocated articulated-arm CMM 200, into the frame of reference of laser tracker 400 which in this example is the common coordinate frame of reference. However, it possible to use, or assign, any suitable frame of reference to be the common coordinate frame of reference. This matrix M(rx, ry, rz, tx, ty, tz) is the entity determined by the relocation procedure, and it the matrix may be computed in any suitable means such as in a processor or in software (not shown) for example. Once it is known, it can equally be applied to a measurement of a probe tip 205 attached to the final link 210. The probe-tip 205 coordinate, as measured by articulated-arm CMM 200, is transformed by matrix M(rx, ry, rz, tx, ty, tz) to give the coordinates of the probe tip 205 in the frame of reference of laser tracker 400.

To find M(rx, ry, rz, tx, ty, tz), the residual error for the $i^{th}$ measurement is defined as $$res_i = |M(rx, ry, rz, tx, ty, tz) \cdot \vec{s}' - \vec{s}|. \quad (4)$$

A standard least-squares fit calculation is performed to find the values of the 6 fit parameters rx, ry, rz, yx, ty, tz that minimize the sum of the squares of the residual errors.

It will be apparent to those skilled in the art that, while an exemplary embodiment has been shown and described, various modifications and variations can be made to the apparatus and method of relocating an articulated-arm CMM by measuring a retroreflector mounted on the articulated-arm CMM with a laser tracker disclosed herein without departing from the spirit or scope of the invention. Accordingly, it is to be understood that the various embodiment has been described by way of illustration and not limitation.

What is claimed is:

1. A system for coordinate measurement comprising:
   a laser tracker;
   a relocatable articulated-arm coordinate measuring machine; and
   a retroreflector located on the articulated-arm coordinate measuring machine;
   wherein the laser tracker sends a laser beam to the retroreflector to measure at least three positions of the retroreflector relative to the laser tracker in a first coordinate system while the articulated-arm coordinate measuring machine measures the at least three positions of the retroreflector relative to the articulated-arm coordinate measuring machine in a second coordinate system; and
   wherein the articulated-arm coordinate measuring machine is relocated to a different position and the laser tracker sends the laser beam to the retroreflector to measure at least three positions of the retroreflector relative to the laser tracker in the first coordinate system while the articulated-arm coordinate measuring machine measures the at least three positions of the retroreflector relative to the articulated-arm coordinate measuring machine in the second coordinate system; and means for transforming the first coordinate system and/or the second coordinate system to a common coordinate frame of reference.

2. The system of claim 1 wherein the laser tracker is fixed in place.

3. The system of claim 1 wherein the retroreflector comprises a spherically mounted retroreflector.

4. The system of claim 1 wherein the retroreflector comprises a cube-corner retroreflector.

5. A laser measurement apparatus for measuring objects comprising:

an articulated-arm coordinate measuring machine;

a laser tracker; and a retroreflector located on an arm of the articulated-arm coordinate measuring machine;

wherein the laser tracker sends a laser beam to the retroreflector to measure at least three positions of the retroreflector relative to the laser tracker in a first coordinate system while the articulated-arm coordinate measuring machine measures the at least three positions of the retroreflector relative to the articulated-arm coordinate measuring machine in a second coordinate system; and wherein the articulated-arm coordinate measuring machine is relocated to a different position and the laser tracker sends a laser beam to the retroreflector to measure at least three positions of the retroreflector relative to the laser tracker in the first coordinate system while the articulated-arm coordinate measuring machine measures the at least three positions of the retroreflector relative to the articulated-arm coordinate measuring machine in the second coordinate system.

* * * * *